United States Patent [19]

Lonardi et al.

[11] Patent Number: 4,765,789
[45] Date of Patent: Aug. 23, 1988

[54] APPARATUS FOR LINING THE INNER WALL OF A VESSEL WITH BRICKS

[75] Inventors: Emile Lonardi, L-Bascharage; Jean Liesch, L-Esch s/Alzette; Michel Kirchen, L-Luxembourg; Victor Kremer, L-Luxembourg; Andre Bock, L-Luxembourg; Joseph Colgon, Belvaux; Charles Hennico, Useldange, all of Luxembourg

[73] Assignees: Paul Wurth S.A; Arbed S.A., both of Luxembourg

[21] Appl. No.: 33,138

[22] Filed: Apr. 1, 1987

[30] Foreign Application Priority Data

Apr. 1, 1986 [LU] Luxembourg .................. 86382

[51] Int. Cl.⁴ .................................. E04G 21/22
[52] U.S. Cl. ............................ 414/10; 182/128; 187/9 E; 266/281
[58] Field of Search .................... 414/10; 266/281; 182/128; 187/9 E, 20; 52/749

[56] References Cited

U.S. PATENT DOCUMENTS

| 3,236,397 | 2/1966 | Lakin | 414/10 |
| 3,298,154 | 1/1967 | Behr et al. | 414/10 X |
| 3,370,888 | 2/1968 | Skendrovic | 182/128 X |
| 3,517,771 | 6/1970 | Mähringer et al. | 182/128 X |
| 4,033,463 | 7/1977 | Cervin | 414/10 |
| 4,354,670 | 10/1982 | Eichbaum et al. | 414/10 X |
| 4,688,773 | 8/1987 | Legille et al. | 266/281 |

FOREIGN PATENT DOCUMENTS

| 1154131 | 9/1963 | Fed. Rep. of Germany | 266/281 |
| 2914651 | 10/1980 | Fed. Rep. of Germany | 414/10 |
| 1375353 | 9/1964 | France | 182/128 |

Primary Examiner—Leslie J. Paperner
Attorney, Agent, or Firm—Fishman, Dionne & Cantor

[57] ABSTRACT

An apparatus comprising a work platform movable inside a vessel and associated with a handling robot for handling and laying bricks is presented. The present invention includes at least two hoists placed next to one another, each hoist comprising several telescopic sections. Carriages move along the hoists in order to raise the bricks individually from a depalletizing station located at the foot of the hoist up to platform level. A depalletizing robot, the action of which is coordinated with that of the handling robot, transfers the bricks from a reserve of several brick pallets onto the carriages of the hoist.

26 Claims, 5 Drawing Sheets

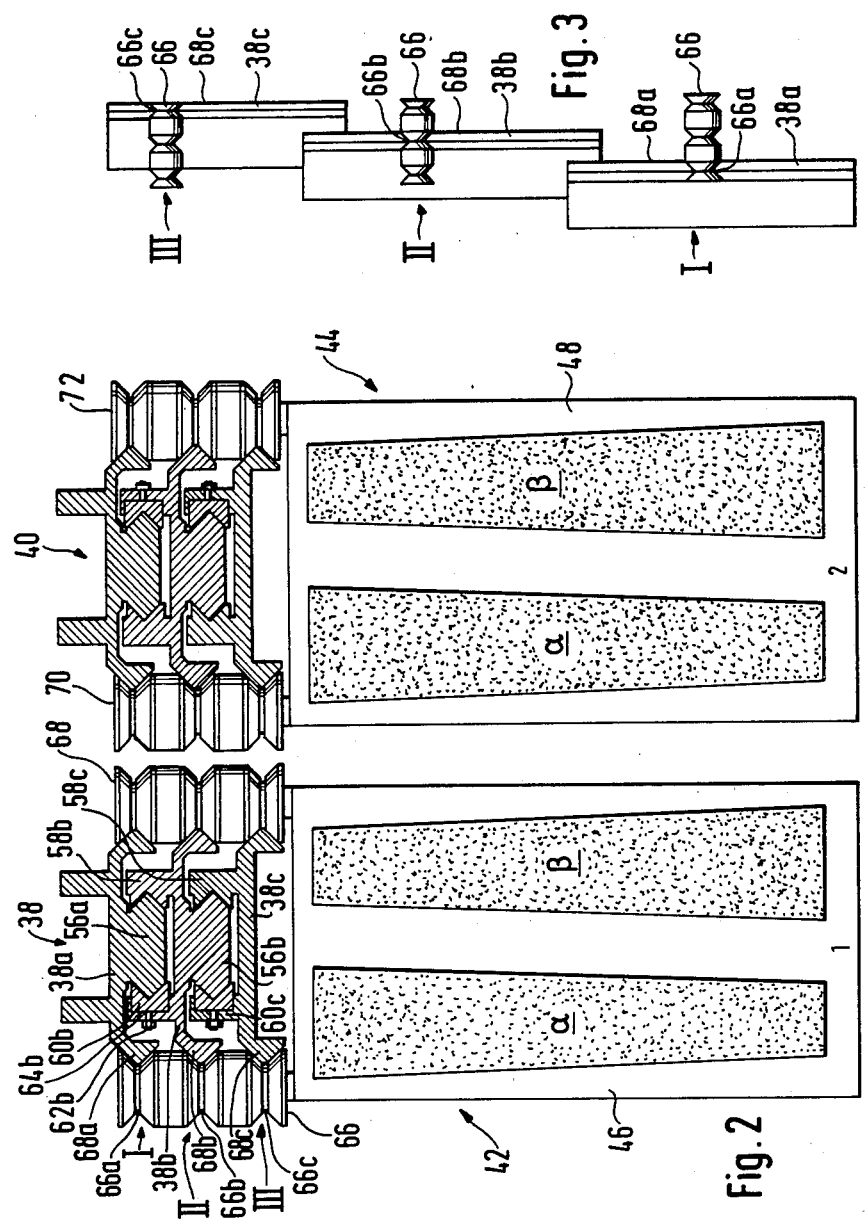

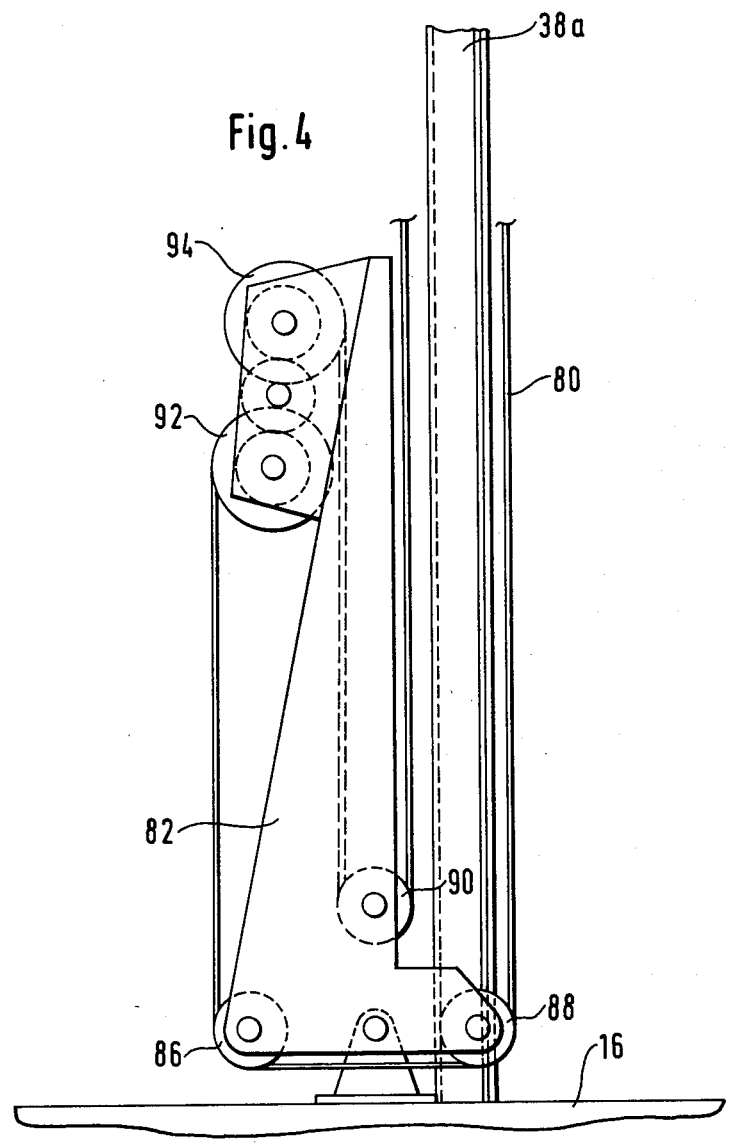

APPARATUS FOR LINING THE INNER WALL OF A VESSEL WITH BRICKS

BACKGROUND OF THE INVENTION

This invention relates to an apparatus for lining the inner wall of a vessel with bricks comprising a work platform movable inside the vessel along its vertical axis and capable of rotating about the latter, retractable props for stabilizing the platform relative to the wall of the vessel, a robot for handling and laying the bricks, and a supervision booth.

The present invention, although not being limited thereto in its utility, is particularly useful as an apparatus for laying a refractory lining on the inner wall of a metallurgical converter.

Various robotized apparatuses (see, for example, LU-A-86,144 corresponding to U.S. patent application Ser. No. 915,635 filed Oct. 6, 1986, now U.S. Pat. No. 4,708,562, assigned to the assignee hereof, all of the contents of which are incorporated herein by reference) have already been proposed for automatically carrying out brick laying work which has heretofore usually been performed manually. As is well known, manual laying of bricks is unsatisfactory because of the difficult and undesirable working conditions. In fact, it will be appreciated that this work not only demands considerable physical effort (the weight of the refractory bricks being on the order of 40 kg), but also that the working conditions are extremely unpleasant because of the dust, the nasty smell of the refractory bricks and the continuous draft through the open converter which functions as a suction chimney.

On the other hand, carrying out this bricklaying work by means of a robot makes it necessary to initially solve a certain number of new and difficult problems. For example, because converters do not all have the same diameters and because the diameter of each converter varies according to its height, two standard types of bricks of different conicities must be manufactured so that the desired curves (matching the curves of the vessel) are obtained by carefully alternating between the types of bricks selected.

For manual brick-lining, it is merely necessary for the two types of bricks to be available on the platform, since the worker can usually select the appropriate type of brick. On the other hand, for the purpose of robotization, it is absolutely essential to provide complicated measuring and programming systems in order to determine and select the appropriate type of brick automatically. Moreover, so that robotized brick-lining is practicable and viable, the automatic operation must be at least as fast as the manual operation, so that it is possible to keep to the critical time allowed for the shutdown of a converter.

To solve these problems and to satisfy the conditions present in the vessel, the above mentioned U.S. patent application Ser. No. 915,635 proposes mounting two brick pallets on the work platform and depalletizing them as required. To simplify robotization and increase the work rate, the laying and depalletizing functions are also separated by providing an automatic depalletizing mechanism on the platform which automatically selects the type of brick from the relevant pallet required by the bricklaying supervision system; and a handling robot which picks up the bricks depalletized in this way and which lays them in place.

However, depalletization on the platform itself takes up a large amount of space, and as a result, the surface of the platform has to be of an appropriately large size. On the other hand, the surface of the platform must be limited so that it is also possible to line the upper part of a converter, where the cross-section progressively decreases. It follows then that this robotization system is difficult to put into effect for converters of relatively small size, if overcrowding of the platform is to be avoided. Moreover, another disadvantage of depalletization on the platform is that the idle time required for changing the pallets has to be taken into account.

Although systems for depalletizing outside the converter, with hoists for individual bricks, as described in German Patent Specification No. 2,914,651 and German Patent Specification No. 2,605,970, are known, nevertheless these systems are intended for manual bricklining. In other words, a robotized apparatus with depalletization outside the converter has not heretofore been known.

SUMMARY OF THE INVENTION

The above-described and other problems and deficiencies of the prior art are overcome or alleviated by the bricklaying apparatus of the present invention. In accordance with the present invention, a bricklining apparatus is provided which is completely robotized, and where depalletization takes place outside the converter. The present invention includes at least two hoists placed next to one another, each hoist comprising several telescopic sections. Carriages move along the hoists in order to raise the bricks individually from a depalletizing station located at the foot of the hoist up to platform level. A depalletizing robot, the action of which is coordinated with that of the handling robot, transfers the bricks from a reserve of several brick pallets onto the carriages of the hoist.

The telescopic sections of each hoist consist of vertical rails, each having, over its entire height, at least one profile piece which is slidably fitted onto a profile piece of matching shape of the rail forming the adjacent section.

The carriage of each hoist has a pair of upper rollers and a pair of lower rollers which are arranged respectively on either side of the telescopic sections of the hoist; and which are equipped with a series of circular profiles, the number of which corresponds to that of the telescopic sections. The circular profiles move along profiles of matching shape on the lateral sides of the rails of each section. Each carriage is adapted to receive, by fastening, either a shelf which can support two bricks placed side by side, or a basket for transporting a person.

Each carriage is moved by a hauling cable which is fastened to the carriage, the ends of which are secured respectively to two drums of the same diameter, driven by an electric or hydraulic motor. The outer surface of each drum has a helical groove for the controlled winding of the cable in a single seat. One of the drums is wider than the other, the difference in width corresponding to the number of winding turns of the length of cable forming the reserve which allows the maximum extension of the hoist, with the carriage of which it is associated. The wider drum is connected by means of a clutch to its drive motor and has a controllable system for braking its rotation. The shaft of each of the drums is associated with a coder which respectively indicates the height of the hoist, (where the coder associated with the wider drum is concerned), and the position of the carriage (where the coder associated with the other drum is concerned).

The above-discussed and other features and advantages of the present invention will be understood and appreciated by those skilled in the art from the following detailed description and drawings.

BRIEF DESCRIPTION OF THE DRAWINGS

Referring now to the drawings, wherein like elements are numbered alike in the several FIGURES:

FIG. 2 is a horizontal cross-section through the hoists;

FIG. 3 is a diagram illustrating the movement of a carriage along a hoist;

FIG. 4 is a diagrammatic side view of the system for moving a carriage;

DESCRIPTION OF THE PREFERRED EMBODIMENT

Figure 1:
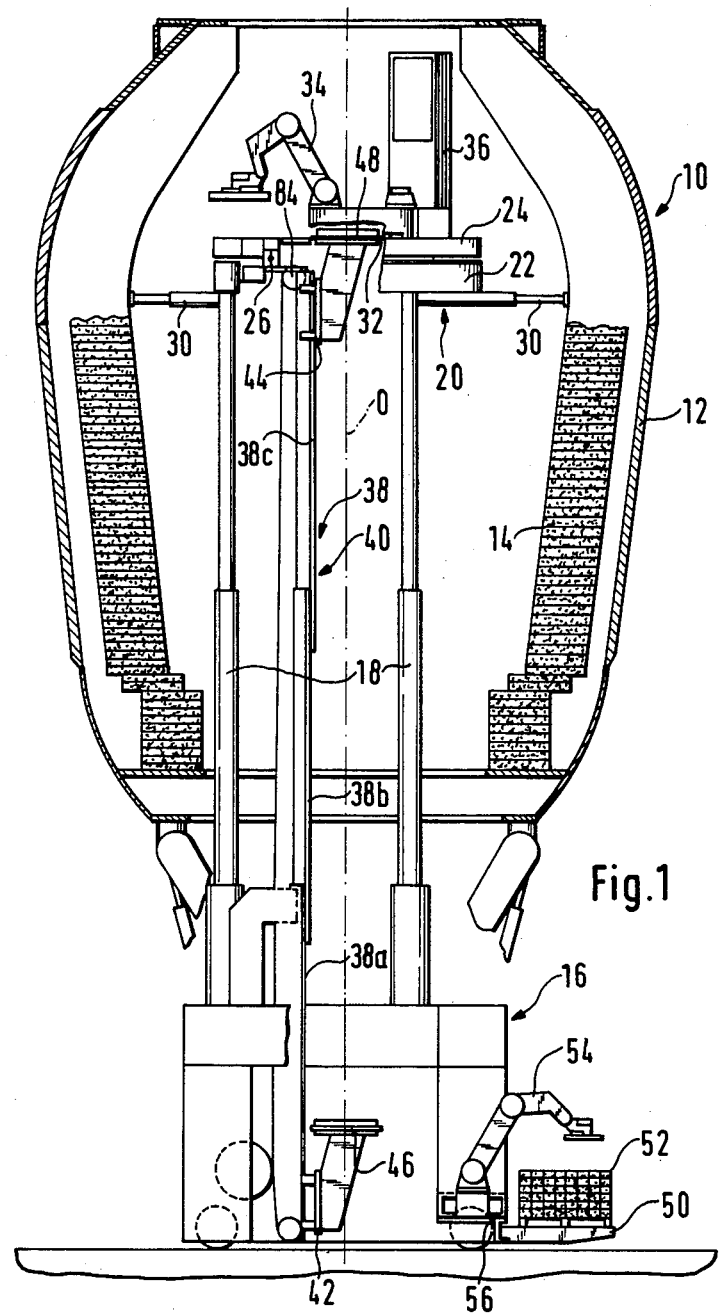
FIG. 1 is a front elevation view, partially in vertical cross-section, of a brick-lining apparatus in the operating position inside a metallurgical converter.

FIG. 1 shows, in vertical cross-section, a converter 10 represented by its metal casing 12 and its inner refractory brick lining 14. Refractory lining 14 has to be renewed at regular intervals. Reference numeral 16 denotes a bracket which supports the brick-lining apparatus and which is mounted on wheels so that it can be transported. On this bracket are mounted several telescopic masts 18 which support a platform 20; and which can move the latter as a result of extension or retraction along the vertical axis of converter 10. Platform 20 comprises a fixed circular support 22, on which rests, by means of a bearing 26, a table 24 provided with a central orifice 32 and which is rotatable about the vertical axis 0 under the action of a motor (not shown). Platform 20 also has several retractable radial props 30, in order to stabilize platform 20 horizontally by bearing on the refractory lining 14 of converter 10. Located on platform 20 are a robot 34 for handling and laying the refractory bricks and a booth 36 which can house a person supervising the brick-lining operation.

Bracket 16 also supports at least two hoists 38 and 40 arranged next to one another (hoist 40 being hidden by hoist 38 in FIG. 1), the upper end of which is freely fastened to platform 20 and the telescopic characteristic of which makes it possible to follow the vertical movement of platform 20. A carriage 42, 44 travels along each hoist 38, 40 and, in the example shown in FIG. 1, carries a shelf 46, 48 for supporting bricks.

On one of the sides of bracket 16 is a stage 50 which is wide enough to be capable of receiving up to four brick pallets which are placed side by side (and of which only one can be seen at 52 in FIG. 1). Next to stage 50 is a depalletizing robot 54 which can be mounted on a rail 56 of bracket 16, in such a way that it can be moved perpendicularly to the plane of FIG. 1 along stage 50, so as to have access to each of the four pallets.

Depalletizing robot 54 can also be a fixed robot identical to handling robot 34. This would provide the advantage of permitting the two robots 54 and 34 to be interchangeable.

In accordance with one of the particularly important features of the apparatus of the present invention, each hoist 38, 40 includes several telescopic sections represented by the sections 38a, 38b and 38c for the hoist 38 of FIG. 1. The details of these telescopic sections are illustrated in FIG. 2 which shows, on an enlarged scale, a cross-section though the two hoists arranged next to one another, with the various sections in a retracted position. Because the two hoists 38, 40 are completely identical to one another, only one of them need be described, in this particular case the hoist 38.

The three sections 38a, 38b, 38c comprise rails of matching profiles which allow them to fit into one another, while at the same time permitting them to slide longitudinally relative to one another. For this purpose, rail 38a has, on its front face, a flange 56a, the cross-section of which has, for example, the form of a flattened hexagon. Flange 56a is fitted between two profile pieces 58b, 60b provided on the rear face of adjacent rail 38b. The two profile pieces 58b, 60b each have a longitudinal groove, the cross-sections of which are in the form of an upturned "V" and match the opposite tips of flange 56a of rail 38a. The rails 38a and 38b can thus slide relative to one another, while at the same time being held together.

The groove of one of the profile pieces 60b is preferably located in a slide 64b fastened to profile piece 60b by means of bolts 62b. Bolts 62b thus makes it possible to adjust the play between rails 38a and 38b.

Intermediate rail 38b has, on its front face, a flange 56b similar to flange 56a of rail 38a. Flange 56b is engaged, in turn, between profile pieces 58c, 60c of matching shape which are provided on the rear face of adjacent rail 38c, thus making it possible for the two rails 38b and 38c to slide relative to one another.

To prevent rail 38c from coming out of rail 38b when the hoist is extended, and to ensure that rail 38c takes up rail 38b when its lower end approaches the upper end of the latter, these two rails are equipped with stops (not shown) which catch at a preselected time and which ensure that the upper rail takes up the lower rail.

In the example shown, a hoist with three telescopic sections has been illustrated, but it is clear that this assembly of the present invention is not limited to three sections.

Each of carriages 42 and 44 is equipped with a pair of upper rollers 66, 68 and 70, 72 and with a pair of lower rollers which cannot be seen in FIG. 2, but which are identical to the upper rollers. Roller 66 has three peripheral grooves 66a, 66b, 66c which move along edges 68a, 68b and 68c have matching triangular cross-sections. It is possible, of course, to have other matching shapes. It is likewise possible to provide circular edges on the rollers and corresponding grooves on the rails. Edges symmetrical to edges 68a, 68b and 68c are provided on the opposite side of rails 38a, 38b, 38c, and are engaged into corresponding grooves of roller 68. The lower rollers (not shown) of carriage 42 and the four rollers of carriage 44 are designed in the same way as rollers 66 and have the same functions.

The movement of the rollers along the edges of each of rails 38a, 38b, and 38c is illustrated in FIG. 3. When roller 66 is raised along the hoist located in its extended position, grooves 66a, 66b and 66c respectively move in succession along edges 68a, 68b and 68c of each of the rails 38a, 38b and 38c. In this way, at least one of the grooves of each roller is always engaged on one of the edges of each of the rails.

In FIG. 2, two bricks are arranged on each of shelves 46, 48 of the two carriages 42, 44. These bricks have been identified by (α) and (β), thus symbolizing the fact that they are bricks of different types, that is bricks having different conicities.

FIG. 4 shows the lower portion of lower section 38a of the hoist and a frame 82 which is mounted on bracket 16 and which carries the system for driving the carriages of the hoist. The carriages are driven by means of a hauling cable 80 moving around an upper guide roller 84 (see FIG. 1) and three lower guide rollers 86, 88 and 90 which are fastened between the lateral flanks of frame 82. The ends of hauling cable 80, which are shown in FIG. 4 and which are attached to carriage 42, are fastened to winding drums 92, 94.

Figure 5:
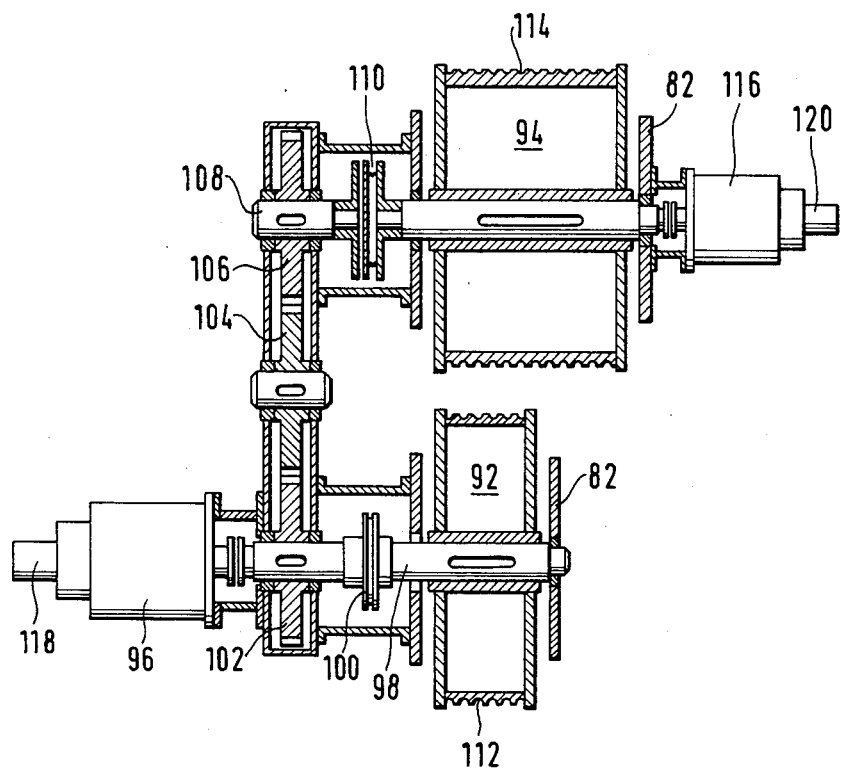
FIG. 5 is a cross-sectional elevation view through the drive system of a hauling cable.

The drive system for winding drums 92, 94 is shown in cross-section in FIG. 5. A main motor 96 (for example, an electric or hydraulic motor), actuates drum 92 via its drive shaft 98. A clutch 100 built into drive shaft 98 makes it possible to separate drum 92 from its drive motor 96. Fastened on shaft 98 is a pinion 102 which, via an intermediate pinion 104, actuates a pinion 106 secured to a shaft 108 of drum 94. A clutch 110 similarly makes it possible to separate drum 94 from its drive pinion 106 which is actuated by motor 96. It should be noted that the three pinions 102, 104 and 106 have the same diameter, so that under the action of motor 96, drums 92 and 94 rotate at the same speed when the two clutches 100 and 110 are engaged. This means that the cable, which is unwound from one of the drums 92 or 94, is wound onto the other drum 94 or 92 at the same speed, because these have exactly the same diameter and the cables are wound onto the drums in opposite directions. To prevent a change in the winding diameter on drums 92 and 94, for example because the cable winds up on itself, the surface of each of drums 92, 94 is provided with a helical groove 112, 114 which forces the cable to be wound up in a single seat.

It should be noted that drum 94 is wider than drum 92. This makes it possible to support the reserve length of cable necessary for the extension of the hoist. This reserve length must be at least equal to twice the maximum extension height of the hoist.

During the extension of the hoist, clutch 110 is disengaged and drum 94 pays out the cable reserve automatically under the pull exterted on the cable. To prevent the cable from unwinding too quickly, a motor 116 fastened to frame 81 is connected to drive shaft 108 of drum 114 and exerts a certain braking force on drum 114. When the hoist is lowered, clutch 110 is likewise disengaged and the cable reserve is wound onto drum 114 under the action of motor 116.

It is possible to prevent the cable from unwinding too quickly during the extension of the hoist by means of a simple system for braking drum 114. The cable reserve could then be wound onto drum 114, during the lowering of the hoist, by means of motor 96, clutch 100 being disengaged and the clutch 110 being engaged.

Instead of the intermediate connecting pinion 104, it is also possible to actuate the two drums by means of motors independent of one another, but rotating in synchronism.

Reference numerals 118 and 120 denote known coders which make it possible to determine the angular positions of drums 92 and 94 and thus supply information relating to the position of the carriage (coder 118); and the height of the hoist (coder 120).

As already mentioned above, during the bricklining operation by means of the apparatus described above, shelves 46, 48 of each of carriages 42, 44 always carry at least one brick of each of the two types (α) and (β). The robot 34, once it has arrived level with platform 20, picks up one of the two bricks which it needs, and the other brick descends again together with the carriage. During this time, depalletizing robot 54 replaces (on the carriage located at the bottom of the hoist) the brick which the handling robot 34 previously picked up therefrom. The apparatus consequently makes it possible for the handling robot 34 to change the type of brick without any loss of time, because the carriage level with the platform 20 always presents it with a brick of each of the two types (α) and (β) whereas in the prior art, during a change in the type of brick, it has been necessary to return the brick of the type no longer suitable and wait for the arrival of the brick of the other type.

If the two robots 34 and 54 are equipped with grabs capable of grasping two superimposed bricks at the same time, it is possible to place on each shelf 46, 48 two superimposed bricks of each type, instead of only one. This of course makes it possible to increase the bricklaying rate, but the hoist has to be arranged so that it can transport double the weight.

Depalletization outside converter 10 leaves sufficient room on platform 20 to make it possible to install a very comfortable, preferably air-conditioned booth 36 on the latter. Another advantage is that broken bricks can be removed at the source and no longer need be lowered from platform 20. Although it is possible for the apparatus to operate correctly with only one reserve of two pallets of types (α) and (β) respectively, in the depalletizing station, it is preferable to provide space required for two pairs of pallets of types (α) and (β). This makes it possible, when a pallet of a particular type is empty, for depalletizing robot 54 to pass to the other pallet of the same type, without loss of time, and replace the empty pallet during this interval.

Figure 6:
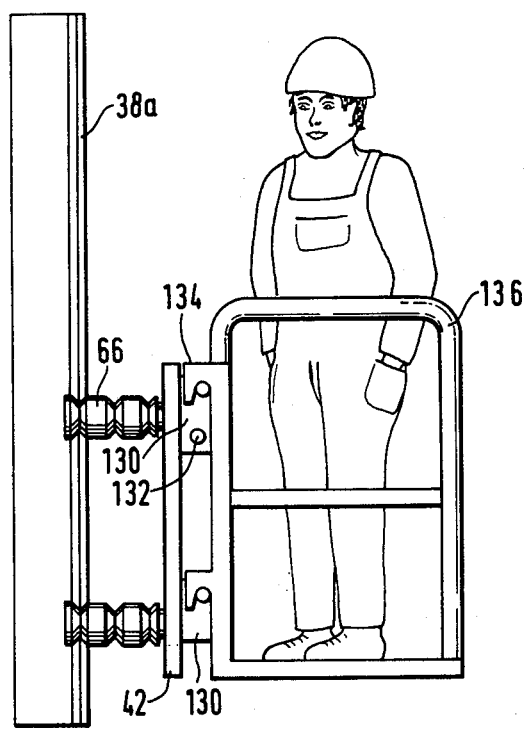
FIG. 6 is a diagrammatic side view of a carriage, to which a basket for transporting a person is fastened.
Figure 7:
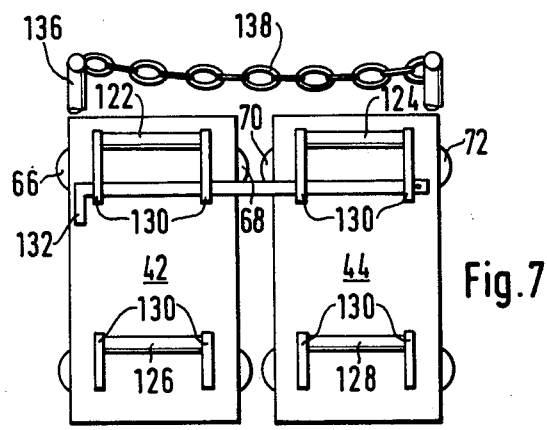
FIG. 7 is a front view of two adjacent carriages in the position in which a basket is attached.

To raise a person to platform 20, the two carriages 42 and 44 are lowered so that they are next to one another at the bottom of hoists 38, 40. As can be seen in FIGS. 6 and 7, the two carriages 42, 44 are each equipped with upper fastening bars 122, 124 and lower bars 126, 128 connecting side cheeks 130 of the carriages 42, 44. For transporting a basket 136, such as that shown in FIG. 6, the two carriages are fixed to one another by passing a bar 132 through the upper or lower cheeks 130 of carriages 42, 44, thereby making it possible for the weight of the person standing in basket 136 to be distributed over the two carriages 42, 44. As can be seen in FIG. 6, basket 136 has hooks 134 which make it possible to fasten it quickly to the four fastening bars 122, 124, 126, 128 of carriages 42 and 44. To increase the safety of the person on basket 136, the latter has protective chains, as indicated at 138 in FIG. 7, on the sides perpendicular to the plane of FIG. 6.

It will be appreciated that shelves 46, 48 are fastened to carriages 42, 44 in a similar manner to basket 136, the only difference being that each shelf 46, 48 is attached to one carriage 42, 44; and that these are not connected together by means of bar 132.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. Apparatus for lining the inner wall of a vessel with bricks comprising a work platform movable inside the vessel along the vertical axis of the vessel and capable of rotating about the vertical axis, first robot means for handling and laying the bricks, and further including:

at least two adjacent hoists, each hoist comprising a plurality of telescopic sections;

carriage means movable along said hoists, said carriage means having a pair of lower rollers and a pair of upper rollers arranged respectively on either side of said telescopic sections of each of said hoists, each of said rollers being equipped with a series of profiles, the number of said profiles corresponding to that of said telescopic sections, said profiles being adapted for movement along profiles of matching shape on the rails of each of said telescopic sections;

depalletizing station means located at the bottom of said hoists wherein said carriage means raises bricks from said depalletizing station means up to the level of said work platform; and second robot means for depalletizing bricks wherein depalletizing of bricks of said second robot means is coordinated with handling and laying by said first robot means and wherein bricks are transferred from pallets onto said carriage means by said second robot means.

2. Apparatus according to claim 1 wherein said telescopic sections of each of said hoists comprises:

vertical rails, each rail having at least one profile piece which is slidably fitted onto a profile of matching shape of the rail forming an adjacent section.

3. Apparatus according to claim 1 wherein:

said profiles of each of said rollers comprise grooves; and the matching profiles of said rails are along lateral sides of said rails.

4. Apparatus according to claim 1 wherein:

said carriage means is adapted to receive a shelf capable of supporting at least two bricks placed side by side.

5. Apparatus according to claim 1 wherein:

said carriage means is adapted to receive a basket for transporting a person.

6. Apparatus according to claim 1 including:

a hauling cable fastened to said carriage means, said hauling cable having two ends;

two drums, one each of said two ends of said hauling cable being secured to one each of said two drums;

motor means, said drums rotating under the action of said motor means; and wherein said carriage means is moved by said hauling cable.

7. Apparatus according to claim 6 wherein:

said two drums have substantially equal diameters.

8. Apparatus according to claim 6 wherein:

one of said two drums is wider than the other of said drums, wherein the width difference corresponds to the number of winding turns of the length of hauling cable forming the reserve which allows for the maximum extension of the hoist.

9. Apparatus according to claim 6 wherein:

each drum has an outer surface, said outer surface having a helical groove for the controlled winding of the cable.

10. Apparatus according to claim 8 wherein:

said wider drum is connected by a clutch to said motor means and including;

means for braking rotation of said wider drum.

11. Apparatus according to claim 10 wherein:

said braking means comprises second motor means.

12. Apparatus according to claim 6 wherein:

each of said drums has a shaft which is associated with coder means, said coder means indicating the height of the hoist and the position of said carriage means.

13. Apparatus of claim 1 including:

retractable props for stabilizing the work platform relative to the wall of the vessel; and a supervision booth.

14. Apparatus for lining the inner wall of a vessel with bricks comprising a work platform movable inside the vessel along the vertical axis of the vessel and capable of rotating about the vertical axis, first robot means for handling and laying the bricks, and further including:

at least two adjacent hoists, each hoist comprising a plurality of telescopic sections;

carriage means movable along said hoists;

depalletizing station means located at the bottom of said hoists wherein said carriage means raises bricks from said depalletizing station means up to the level of said work platform;

second robot means for depalletizing bricks wherein depalletizing of bricks by said second robot means is coordinated with handling and laying by said first robot means and wherein bricks are transferred from pallets onto said carriage means by said second robot means;

a hauling cable fastened to said carriage means, said hauling cable having two ends;

two drums, one each of said two ends of said hauling cable being secured to one each of said two drums;

motor means, said drums rotating under the action of said motor means; and wherein said carriage means is moved by said hauling cable.

15. Apparatus according to claim 14 wherein said telescopic sections of each of said hoists comprises:

vertical rails, each rail having at least one profile piece which is slidably fitted onto a profile of matching shape of the rail forming an adjacent section.

16. Apparatus according to claim 14 wherein:

said carriage means has a pair of lower rollers and a pair of upper rollers arranged respectively on either side of said telescopic sections of each of said hoists, each of said rollers being equipped with a series of profiles, the number of which corresponds to that of said telescopic sections, said profiles being adapted for movement along profiles of matching shape on the rails of each of said sections.

17. Apparatus according to claim 16 wherein:

said profiles of each of said rollers comprise grooves; and the matching profiles of said rails are along lateral sides of said rails.

18. Apparatus according to claim 14 wherein:

said carriage means is adapted to receive a shelf capable of supporting at least two bricks placed side by side.

19. Apparatus according to claim 14 wherein:
said carriage means is adapted to receive a basket for transporting a person.

20. Apparatus according to claim 14 wherein:
said two drums have substantially equal diameters.

21. Apparatus according to claim 14 wherein:
one of said two drums is wider than the other of said drums, wherein the width difference corresponds to the number of winding turns of the length of hauling cable forming the reserve which allows for the maximum extension of the hoist.

22. Apparatus according to claim 14 wherein:
each drum has an outer surface, said outer surface having a helical groove for the controlled winding of the cable.

23. Apparatus according to claim 21 wherein:
said wider drum is connected by a clutch to said motor means and including;
means for braking rotation of said wider drum.

24. Apparatus according to claim 23 wherein:
said braking means comprises second motor means.

25. Apparatus according to claim 14 wherein:
each of said drums has a shaft which is associated with coder means, said coder means indicating the height of the hoist and the position of said carriage means.

26. Apparatus of claim 14 including:
retractable props for stabilizing the work platform relative to the wall of the vessel; and
a supervision booth.

* * * * *